No. 840,249. PATENTED JAN. 1, 1907.
D. W. PATTON.
NUT LOCK.
APPLICATION FILED JULY 19, 1906.
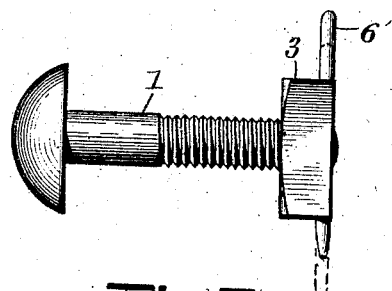
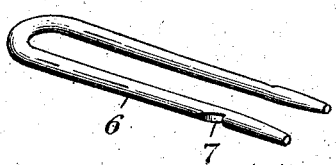
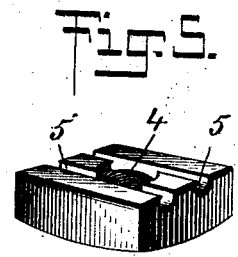
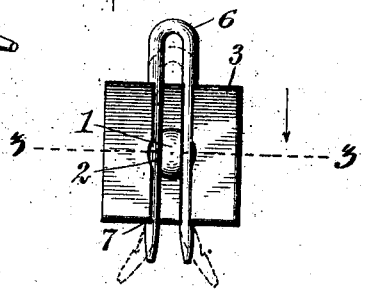
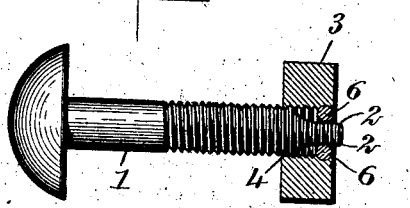
WITNESSES
INVENTOR
David W. Patton
BY
ATTORNEYS

UNITED STATES PATENT OFFICE.

DAVID W. PATTON, OF MOBERLY, MISSOURI.

NUT-LOCK.

No. 840,249.

Specification of Letters Patent.

Patented Jan. 1, 1907.

Application filed July 19, 1906. Serial No. 326,849.

*To all whom it may concern:*

Be it known that I, DAVID W. PATTON, a citizen of the United States, and a resident of Moberly, in the county of Randolph and State of Missouri, have invented a new and Improved Nut-Lock, of which the following is a full, clear, and exact description.

This invention relates to an improvement in nut-locks, the object of the invention being to provide a simple and very easily operated device inexpensive to manufacture and very effectual in the performance of its functions.

Reference is to be had to the accompanying drawings, which form part of this specification, in which drawings like characters of reference indicate like parts throughout the views, and in which—

Figure 1 is a side elevation of a bolt, nut, and locking means involving my invention. Fig. 2 is an end elevation thereof. Fig. 3 is a section on the line 3 3 of Fig. 2, a portion of the bolt being shown in elevation. Fig. 4 is a perspective view of the locking means, and Fig. 5 is a perspective view of the nut.

In the form of the invention illustrated I employ an ordinary bolt 1, having a portion of the threaded end thereof cut away on opposite sides to form two parallel substantially flat surfaces 2. In connection with this bolt I employ the ordinary form of nut 3, having the usual threaded passage 4, adapted to fit the threaded end of the bolt. In the outer surface of the nut 3 two parallel grooves 5 are cut, each being substantially circular in cross-section and flush with the surface of the nut. These grooves intersect the main threaded passage of the nut on opposite sides, and the distance between the two grooves is substantially the same as the thickness of the flat end portion of the bolt. In conjunction with the bolt and nut above described I employ a U-shaped staple 6, preferably formed from a piece of wire and having notches 7 cut in the outer sides thereof adjacent the ends.

In the use of my invention the nut is screwed on the bolt to the distance desired and turned so that the flattened end portion of the bolt lies parallel to the grooves in the nut. The staple 6 is then inserted in the grooves, thus firmly holding the flattened end portion of the bolt between the two arms thereof and preventing its rotation, as clearly indicated in Figs. 2 and 3. The two arms of the locking member preferably diverge slightly, and upon their insertion in the grooves to the required distance the notches engage the edges of the nut and prevent the accidental displacement of the locking member. The locking member being preferably of wire, its outer ends may be bent out of alinement after its insertion, thus serving as an additional means for holding the same in place.

It is evident that the flattened portions 2 2 of the bolt may extend any desired distance required, according to the use to which the bolt may be applied, and the locking member may be applied to the inner rather than the outer surface of the nut, or holes may be drilled intermediate the two surfaces instead of providing the grooves illustrated in the drawings.

Other minor changes may be made without departing from the spirit of the invention.

Having thus described my invention, what I claim as new, and desire to secure by Letters Patent, is—

1. In combination, a bolt having portions of its end cut away on opposite sides to form substantially flat parallel surfaces, a nut having the usual threaded opening therethrough and two parallel grooves in one face thereof intersecting the threaded opening, and a staple formed of a piece of wire and having the ends thereof bent parallel and inserted in said groove and holding the flattened end of the bolt from rotation, said arms having notches adjacent their ends adapted to engage with the nut and hold the arms from accidental displacement.

2. The combination with a nut provided with two grooves, circular in cross-section, tangent to the face of the nut, and intersecting the threaded opening of the nut, of a bolt having a portion of its threaded end cut away on opposite sides leaving the thickness of the remaining portion substantially equal to the distance between the grooves in the nut, and a staple having two arms, each provided with a notch adjacent its outer end, the arms of the staple being adapted to enter the grooves of the nut and contact with the opposite sides of the flattened end of the bolt to prevent the bolt or nut from turning in respect to the other, and the staple being held 5 in place by the engagement of the notches on the staple-arms with the side of the nut at the ends of the grooves.

In testimony whereof I have signed my name to this specification in the presence of two subscribing witnesses.

DAVID W. PATTON.

Witnesses:
EMIL F. GUTEKUNST,
WILLARD P. COVE.